United States Patent [19]

Crane

[11] 3,926,086
[45] Dec. 16, 1975

[54] PORTABLE SAW MILL

[76] Inventor: Paul R. Crane, Tucker Hill, Houghton, N.Y. 14744

[22] Filed: Nov. 1, 1974

[21] Appl. No.: 519,826

[52] U.S. Cl. .................... 83/801; 83/795; 83/794; 83/745
[51] Int. Cl.² .................... B27B 17/02; B23D 57/02
[58] Field of Search ............ 83/794, 795, 801, 796, 83/797, 798, 799, 800, 743, 745

[56] References Cited
UNITED STATES PATENTS

| | | | |
|---|---|---|---|
| 1,238,436 | 8/1917 | Reece | 83/801 |
| 3,695,316 | 10/1972 | Pluckhahn | 83/794 |
| 3,721,146 | 3/1973 | McManama | 83/795 |

FOREIGN PATENTS OR APPLICATIONS

| | | | |
|---|---|---|---|
| 682,188 | 11/1952 | United Kingdom | 83/801 |
| 954,899 | 6/1949 | France | 83/795 |

*Primary Examiner*—Donald R. Schran
*Attorney, Agent, or Firm*—Sommer & Sommer

[57] ABSTRACT

A portable saw mill adapted to make a longitudinal cut in a log includes an elongated frame having a front end, a rear end, a horizontal lower section adapted to support a log, and a horizontal upper section spaced above the lower section. A carriage is mounted on the frame upper section for movement therealong. A flexible cable has its ends secured to the carriage, a front portion passed around an idler pulley mounted on the front end of the frame, and a rear portion wound around a rotatable drum journalled on the rear end of the frame. A conventional chain saw is positioned between the upper and lower frame sections and is supported by the carriage. A pair of vertically-movable racks have their lower ends connected to the bar of the chain saw, and have intermediate portions engaging pinions mounted on a rotatable shaft journalled on the carriage. By rotating this shaft, the racks may be moved vertically to raise or lower the chain saw relative to a log being sawed.

13 Claims, 9 Drawing Figures

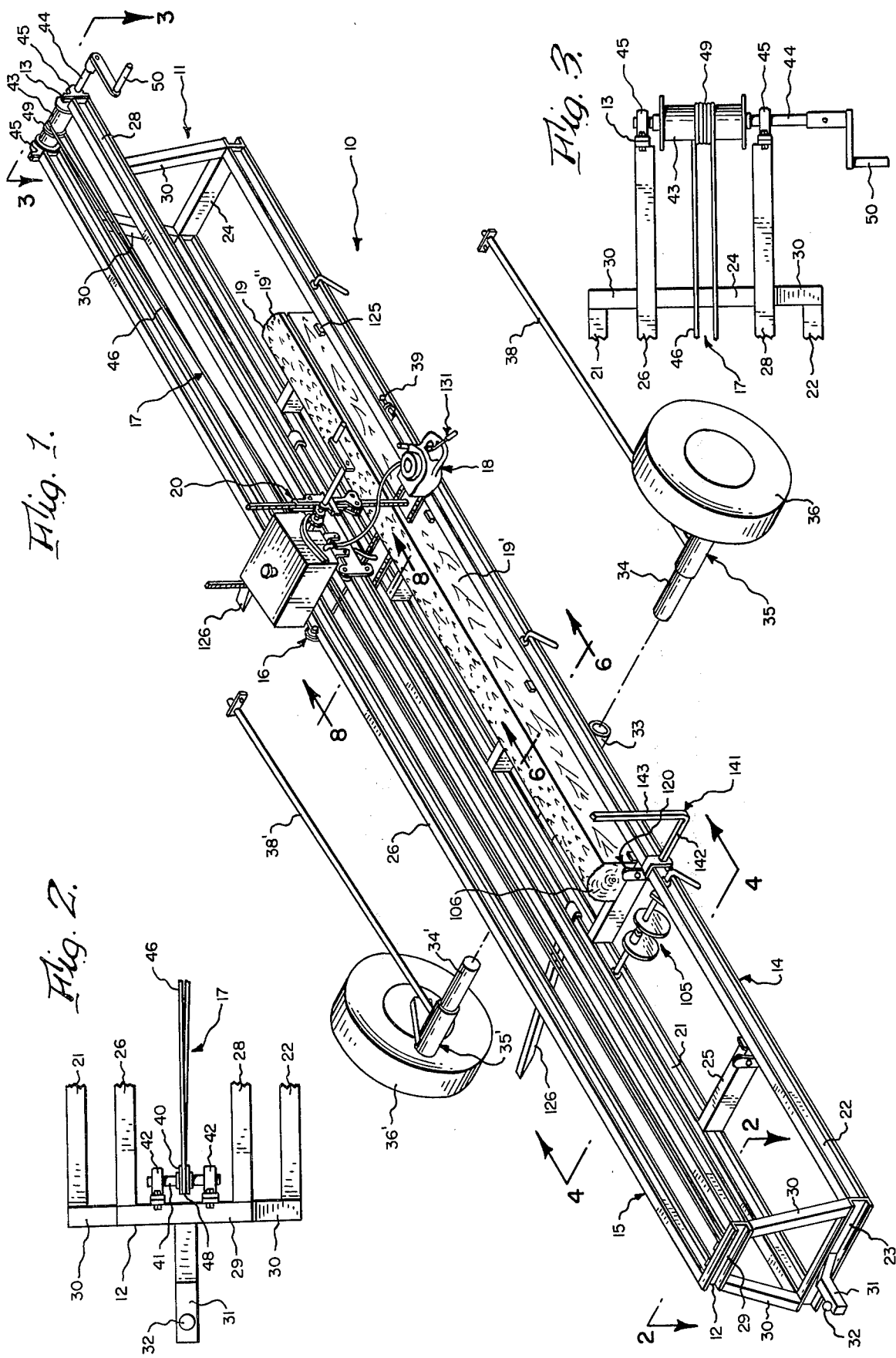

U.S. Patent  Dec. 16, 1975  Sheet 2 of 3  3,926,086
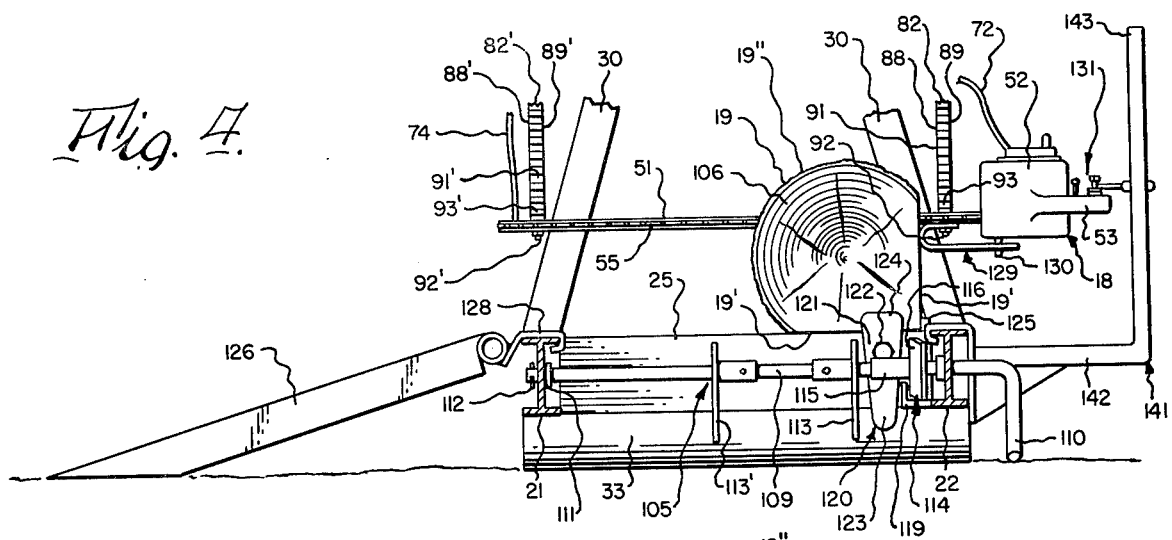

PORTABLE SAW MILL

BACKGROUND OF THE INVENTION

1. Field of the Invention

The present invention relates generally to the art of saw mills, and more particularly to a portable saw mill having a conventional chain saw adapted to make a high quality longitudinal cut in a log.

2. Description of the Prior Art

Others have provided embodiments of a portable saw mill adapted to make a longitudinal cut in a log, these earlier devices having general utility but being particularly suited for small farmers and woodlot owners.

Such prior art efforts to develop a satisfactory portable saw mill are representatively shown in Bryan U.S. Pat. No. 951,937; Thompson U.S. Pat. No. 774,290; McManama U.S. Pat. No. 3,721,146; Knapp U.S. Pat. No. 2,073,407; and Hedblom U.S. Pat. No. 2,831,511.

However, none of these earlier attempts are believed to have provided apparatus employing a readily available chain saw to make a longitudinal cut in a log.

SUMMARY OF THE INVENTION

The present invention provides an improved saw mill wherein a conventional chain saw is adapted to make a longitudinal cut in a log.

In the presently preferred embodiment, the saw mill includes an elongated frame having a horizontal lower section adapted to support a log to be sawed, and a horizontal upper section spaced above the lower section; a carriage arranged on the upper section for longitudinal movement therealong; carriage movement means operatively interposed between the carriage and frame to move the carriage along the upper section; a conventional chain saw supported by the carriage and positioned between the upper and lower frame sections and operable to make a longitudinal cut in a log; and adjustment means operatively arranged between the saw means and carriage to adjust the vertical position of the saw means relative to the carriage.

In the presently preferred embodiment, the adjustment means may include a pair of transversely-spaced vertically-movable racks having their lower ends operatively connected to the bar of the chain saw, a transverse shaft rotatably mounted on the carriage, and a pair of transversely-spaced pinions fast to this shaft and engaging the racks. Hence, by suitably rotating this shaft, the racks and the attached chain saw may be raised or lowered relative to the carriage and to a log being sawed.

The carriage movement means may include a freely-rotatable idler pulley suitably mounted on the frame proximate one of its ends; a rotatable drum suitably mounted on the frame proximate the other of its ends; and a flexible cable having its ends secured to the carriage, having one portion passed around the pulley, and having another portion wrapped or wound tightly around the drum, whereby by rotating the drum in one angular direction the carriage may be moved in one longitudinal direction, and by rotating the drum in the opposite angular direction and the carriage may be moved in the opposite longitudinal direction.

If desired, the carriage may support a fuel tank communicating via a fuel conduit with the fuel tank of the chain saw, and an oil tank communicating via an oil conduit with the bar of the chain saw for lubricating the bar track groove along which the cutting chain is moved.

The adjustment means may further include stop means mounted on the carriage and adapted to releasably hold the transverse shaft immovable at a selected angular position to maintain a selected vertical height of the chain saw. In the preferred form, the stop means includes a stop pinion mounted fast to the shaft, and a lever pivotally mounted on the carriage and having a toothed portion or sector adapted to matingly engage the stop pinion to hold the shaft immovable at a selected angular position.

The saw mill may further include holding means mounted on the frame lower section for supporting the arcuate under surface of a log to be sawed. These holding means may comprise a plurality of rotatable shafts suitably journalled in the frame lower section at longitudinally-spaced locations and severally having a pair of transversely-spaced cam members, such as eccentrically-mounted circular discs, fast thereto such that by suitably rotating this shaft the operative disc edges may be either exposed or concealed.

Moreover, the saw mill may further include trigger disengagement means engaging the chain saw throttle trigger and operative to cause the saw to return to an idle speed when the trigger deactivating means strikes an object as the cutting saw exits a log being sawed.

Finally, the inventive saw mill may include a counterweighted end stop pivotally mounted on the frame lower section and adapted to normally engage an end face of a log being sawed to prevent longitudinal movement relative to the frame, but also adapted to pivot to an inoperative position concealed within the frame lower section.

Accordingly, one object of the present invention is to provide an improved saw mill wherein a conventional chain saw may be employed to make a longitudinal cut in a log.

Another object is to provide an improved portable saw mill which may be trailed from one location to another.

Another object is to provide a saw mill wherein a log may be supported against both longitudinal and transverse movement relative to a log-supporting frame.

Another object is to provide an inexpensive and low cost saw mill which may be readily assembled from commonly-available parts and components.

Still another object is to provide an improved saw mill wherein a chain saw operating at a cutting speed and exiting a log being sawed may be automatically returned to an idle speed.

These and other objects and advantages will become apparent from the foregoing and ongoing specification, the drawings, and the appended claims.

BRIEF DESCRIPTION OF THE DRAWINGS

FIG. 1 is a perspective view of the saw mill principally illustrating the upper and lower sections of the frame, the carriage mounted on the upper section for movement therealong, the carriage movement means, the adjustment means arranged to adjust the vertical position of a chain saw with respect to the carriage, and the position of a partially squared log being sawed, and further illustrating the position of the demountable wheel assemblies in exploded aligned relation to the sleeve mounted on the underside of the frame lower section.

FIG. 2 is an enlarged fragmentary top plan view thereof, taken generally on line 2—2 of FIG. 1, and showing the freely-rotatable idler pulley mounted on a shaft journalled in a pair of pillow blocks secured to the front channel of the frame upper section.

FIG. 3 is an enlarged fragmentary top plan view thereof, taken generally on line 3—3 of FIG. 1, and illustrating the rotatable drum mounted on a shaft suitably journalled in a pair of pillow blocks secured to the rear ends of the upper section I-beams, and further showing the carriage-moving cable wrapped tightly around the drum.

FIG. 4 is an enlarged fragmentary transverse vertical sectional view thereof, taken generally on line 4—4 of FIG. 1, and particularly showing the frame lower section in transverse cross-section, the ramps, an end stop engaging the end face of a partially-squared log being sawed, the horizontal chain saw, and the holding means retracted to an inoperative position concealed within the frame lower section.

FIG. 5 is an enlarged fragmentary transverse vertical section view similar to FIG. 4, but showing the holding means in an operative raised position to support the arcuate lower surface of a log, and further showing the peavey stop in its operative raised position.

FIG. 6 is a further enlarged fragmentary transverse vertical sectional view thereof, taken at an intermediate point of the frame on line 6—6 of FIG. 1, and illustrating the vertical planar side face of a partially squared log engaging the raised bosses, and further illustrating an intermediate end stop pivoted approximately 90° in a clockwise direction to an inoperative concealed position.

FIG. 7 is a greatly enlarged perspective view of the handle of the chain saw, this view illustrating the throttle trigger disengagement means beginning to contact the abutment post.

DESCRIPTION OF THE PREFERRED EMBODIMENT

Figure 8:
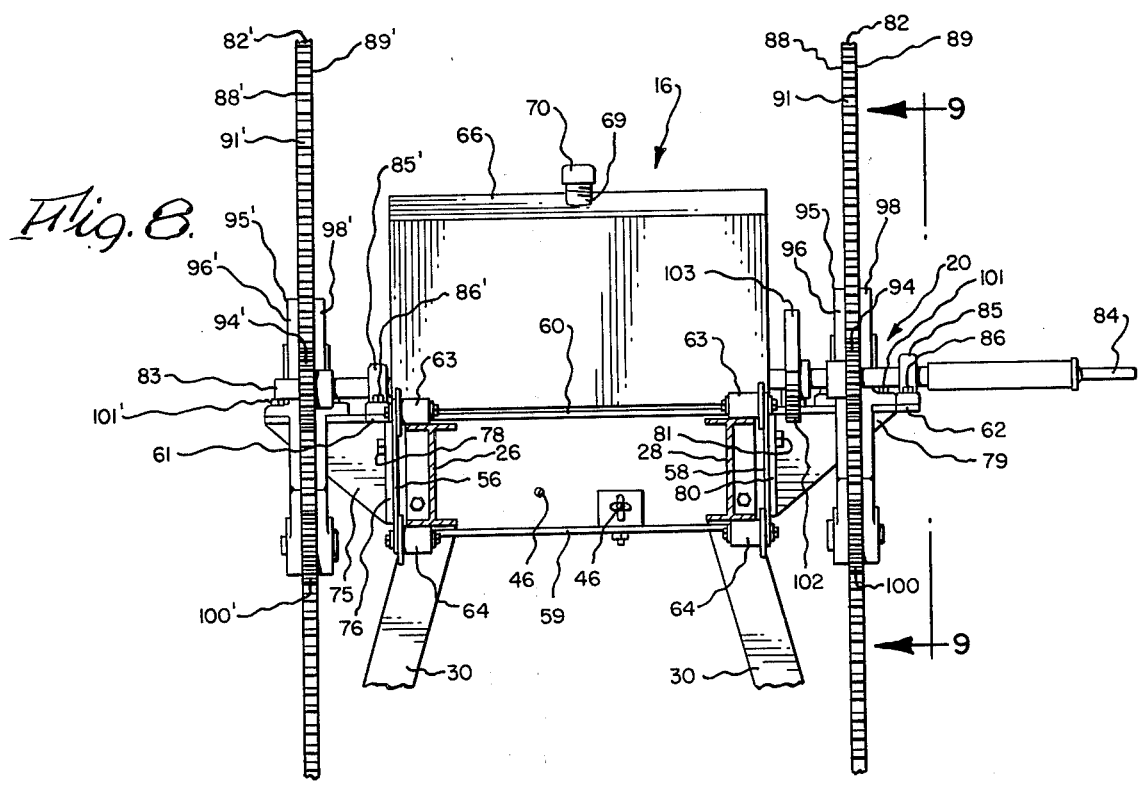
FIG. 8 is an enlarged fragmentary transverse vertical sectional view thereof, taken generally on line 8—8 of FIG. 1, depicting the frame upper section in transverse cross-section and further illustrating the saw-supporting carriage and the racks and pinions of the adjustment means in front elevation.

At the outset, it should be clearly understood that like reference numerals are intended to identify the same elements and/or structure consistently throughout the several drawing figures, as such elements and/or structure may be further described or explained by the entire written specification of which this detailed description is an integral part.

As used herein and in the appended claims, the word "horizontal" is intended broadly, and not specifically, to refer to a general attitude of orientation and should be construed to include the attitude of the frame when resting upon uneven or inclined ground even though this attitude might not necessarily be parallel with the plane of the horizon. By the same token, the term "vertical" is intended broadly, and not specifically, to refer to a general attitude of orientation which is perpendicular to the aforesaid "horizontal" attitude.

Referring initially to FIG. 1, a presently preferred embodiment of the inventive saw mill, generally indicated at 10, is shown as broadly including an elongated frame 11 having a leftward front end 12 and a rightward end 13, and further including a horizontal lower section 14 and a horizontal upper section 15 spaced above the lower section; a carriage, generally indicated at 16, arranged on the frame upper section 15 for movement therealong in either longitudinal direction; carriage movement means, generally indicated at 17, engaging carriage 16 and the front and rear frame ends 12, 13 and operable to move the carriage along the upper section in either longitudinal direction; a conventional portable chain saw, generally indicated at 18, positioned between the upper and lower frame section 14, 15 and supported by carriage 16 for movement therewith and operable to make a horizontal longitudinal cut in a log 19 supported by frame lower section 14; and adjustment means, generally indicated at 20, operatively arranged between the chain saw and the carriage 16 for adjusting the vertical position of the chain saw 18 relative to the carriage 16.

As seen in FIG. 1, the frame lower section 14 includes a pair of transversely-spaced longitudinally-extending left and right I-beams 21, 22, respectively, which are connected at their front ends by a forwardly-facing transverse front channel 23, at their rear ends by a rearwardly-facing transverse rear channel 24, and intermediately by a plurality of longitudinally-spaced rearwardly-facing transverse intermediate channels 25, five of these intermediate channels being shown in FIG. 1. The frame lower section 14 may be suitably assembled, as by welding, so that the upper surfaces of the top flanges of I-beams 21, 22, and the several transverse channels 23, 24, 25, will all lie in a common horizontal plane to support a squared face 19' of a log 19 being sawed (FIGS. 1, 4, and 6).

The frame upper section 15 also includes a pair of transversely-spaced longitudinally-extending left and right I-beams, 26, 28, respectively which are more closely spaced than the I-beams 21, 22 of the lower section 14, and are connected at their front ends by a forwardly-facing transverse front channel 29. The frame upper section 15 may be similarly assembled, again as by welding, such that the upper and lower surfaces of the webs of I-beams 26, 28 lie in horizontal planes parallel to the aforesaid common horizontal plane of the frame lower section 14.

The frame upper section 15 is shown spaced above the frame lower section 14 by four upwardly and transversely-inwardly inclined box beam legs 30 having their lower ends suitably fixed, as by welding, to the frame lower section proximate the four corners thereof and having their upper ends fixed, again as by welding, to the frame upper section 15. Therefore, frame 11 presents a generally isoscles trapezoidal outline when viewed in front elevation, the front channels 23 and 29 being the parallel long and short base legs and inclined box beams 30,30 representing the non-parallel legs.

Still referring primarily to FIG. 1, the presently preferred embodiment of saw mill 10 is shown to be portable and trailable behind a tow vehicle (not shown). To this end, the frame 11 has a tongue 31 projecting forwardly from the front channel 23 of the lower frame section, and provided with a ball 32 adapted to be captured by a suitable ball hitch (not shown) on the tow vehicle. Moreover, a transversely-extending cylindrical sleeve 33 is shown secured to the underside of the frame lower section 14 at an intermediate point of its longitudinal extent. The right and left open ends of sleeve 33 are adapted to receive the eccentrically-positioned shafts 34, 34' of a pair of right and left demountable wheel assemblies 35, 35', respectively, which include ground-engaging wheels 36, 36' and elongated levers 38, 38' connected to shafts 34, 34', respectively, and projecting normally therefrom. It will be readily appreciated by those skilled in this art that after shafts 34, 34' have been inserted into sleeve 33, levers 38, 38' may be grasped proximate the free ends thereof and suitably moved to rotate the wheel assemblies 35, 35' to raise the frame to the trailable position depicted in FIG. 1 with the levers 38, 38' extending horizontally rearwardly, or otherwise moved to lower the frame onto the ground after which wheel assemblies 35, 35' may be removed. When so resting upon the ground, it is contemplated that the operator will provide suitable blocks (not shown) beneath the lower section so that the frame will not teeter about sleeve 33. When the frame is raised to the trailable position, the levers 38, 38' are adapted to be retained in such horizontal rearwardly-projecting position by pins 39, 39' mounted on the frame lower section and adapted to suitably engage the free ends of these levers. Moreover, the present invention further contemplates that when it is desired to tow the saw mill 10 from one location to another, suitable means be provided to retain shafts 34, 34' in such operative engagement with sleeve 33 to prevent unintended separation of the wheel assemblies 35, 35' from the frame.

Referring now collectively to FIGS. 1–3, the saw mill 10 further includes carriage movement means 17 having a freelyrotatable idler pulley 40 mounted on shaft 41 suitably journalled in a pair of transversely-spaced pillow blocks 42 bolted to frame upper section front channel 29 (FIG. 2); a rotatable drum 43 fast to a transverse shaft 44 suitably journalled in a pair of transversely-spaced pillow blocks 45 bolted to the rear ends of the upper section I-beams 26, 28; and a flexible cable 46 having its ends suitably secured to carriage 16, having one forward portion 48 passed around front idler pulley 40, and having another rearward portion 49 wound or wrapped tightly several times around drum 43 at the rear of the frame. Cable 46 is preferably maintained in a taut condition such that when the handle 50 of shaft 44 is rotated in one angular direction, no slippage will occur between cable portion 49 and drum 43 and the carriage 16 may be moved along the frame upper section in one longitudinal direction, and when handle 50 is rotated in the opposite angular direction, carriage 16 may be moved in the opposite longitudinal direction.

Referring now to FIGS. 1, 4 and 7, the chain saw 18 is shown as having a transversely-elongated horizontal bar 51, a driving motor contained within a motor housing 52, and a handle 53 provided with a pivotal throttle trigger 54 which may be squeezed in the well known manner to adjust the speed of the operating saw between a relatively slow idle speed and a relatively fast cutting speed. As will be readily grasped by persons skilled in this art, the saw motor causes a cutting chain 55 to move about the periphery of the bar in a slotted track groove (not shown) when the saw is operated at its cutting speed.

Figure 9:
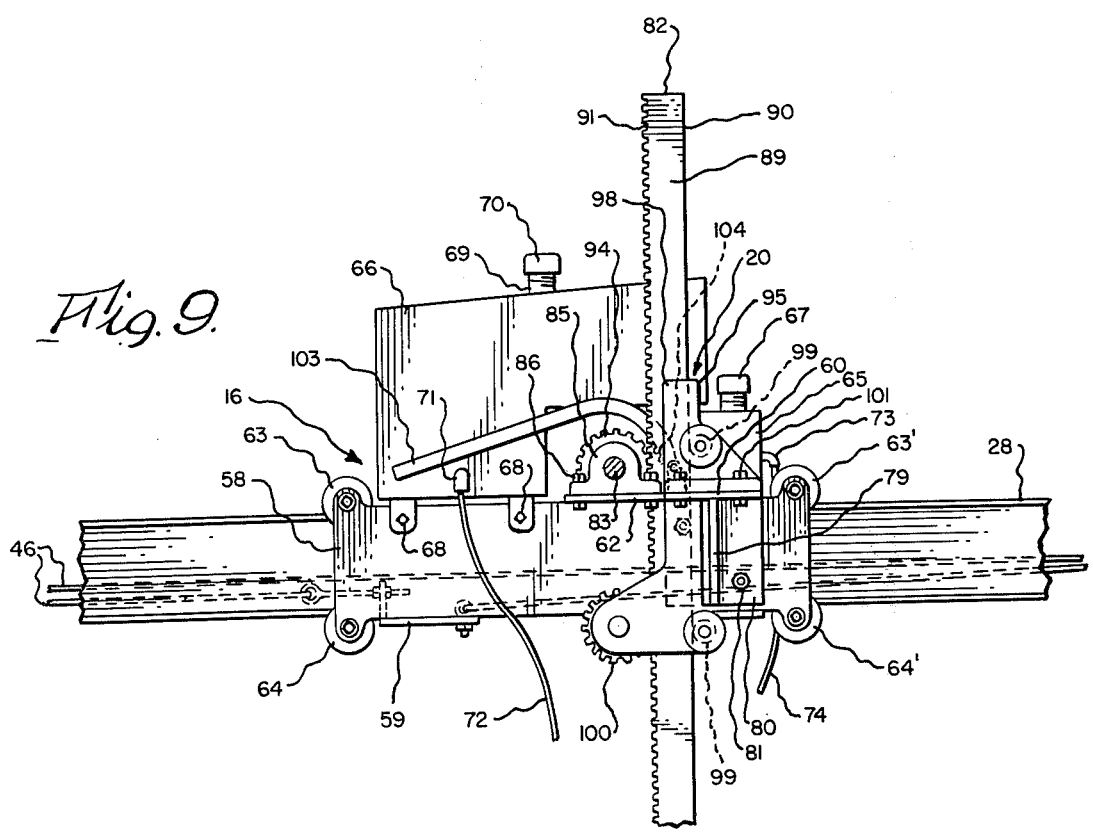
FIG. 9 is a fragmentary longitudinal vertical sectional view thereof, taken generally on line 9—9 of FIG. 8, illustrating the carriage in right side elevation and further showing the right rack arranged to move in the right rack guide.

As best shown in FIGS. 8 and 9, the carriage 16 includes a vertical left side plate 56 arranged to face the left outer side of upper section left I-beam 26; a vertical right side plate 58 arranged to face the right outer side of upper section right I-beam 28; a lower transversely-extending horizontal bottom plate 59 arranged beneath upper section I-beams 26, 28 and having its marginal left edge portions suitably secured, as by a plurality of fasteners, to a lower portion of left side plate 56, and having its marginal right edge portion similarly secured to a lower portion of right side plate 58; and an upper transversely-extending horizontal top plate 60 arranged above upper section I-beams 26, 28 and having a leftward table portion 61 extending outwardly beyond left side plate 56, and a rightward table portion 62 extending outwardly beyond right side plate 58, for purposes hereinafter apparent. Each of the carriage side plates 56, 58 is shown provided with an upper pair of longitudinally-spaced freely-rotatable front and rear top rollers 63, 63' which extend inwardly of the upper section 15 and are operatively arranged to ride on the top flanges of I-beams 26, 28, and a similar lower pair of longitudinally-spaced freely-rotatable front and rear bottom rollers 64, 64' which also extend inwardly of the upper section 15 and are operatively arranged to ride on the bottom flanges of I-beams 26, 28.

In FIG. 9, the carriage is shown as further including a rearward transversely-elongated rectangular oil tank 65 resting on and suitably secured to carriage top plate 60 and having a filler neck adapted to be covered by a filler cap 67, and a forward fuel tank 66 suitably secured, as by bolt fasteners 68, to the carriage left and right side plates 56, 58 and provided with a conventional filler neck 69 adapted to be covered by a suitable filler cap 70. The right side of fuel tank 66 is shown provided with an elbow fitting 71, and a fuel conduit 72 has its upper end operatively connected to fitting 71 and has its lower end operatively arranged to deliver fuel downwardly from tank 66 to the fuel tank of the chain saw. The oil tank 65 is also provided with a fitting 73, similar to fitting 71, and an oil conduit 74 has its upper end operatively connected to this oil tank fitting 73 and has its lower end operatively arranged to deliver oil from oil tank 65 downwardly to the bar 51 of the chain saw to lubricate the peripheral slotted track groove (not shown) along which the cutting chain 55 is moved (FIG. 4).

Adverting now primarily to FIG. 8, the leftward table portion 61 of carriage top plate 60 is shown supported by a transversely-extending vertical triangular gusset plate 75 having its upper horizontal edge arranged to support table portion 61, and having its rightward vertical edge suitably secured, as by welding, to a longitudinally-extending vertical rectangular left plate 76 releasably secured to carriage left side plate 56 by a plurality of bolt fasteners 78. Similarly, the rightward table portion 62 of carriage top plate 60 is also supported by a transversely-extending vertical triangular gusset plate 79 having its upper horizontal edge arranged to support table portion 62, and having its leftward vertical edge suitably secured, as by welding, to a longitudinally-extending vertical rectangular right vertical plate 80 releasably secured to carriage right side plate 58 by a plurality of bolt fasteners 81.

Adverting now to FIGS. 8 and 9, the saw mill 10 further includes adjustment means 20 operatively arranged between the chain saw 18 and the carriage 16 for adjusting the vertical position of the chain saw relative to the carriage. In the presently preferred embodiment, the adjustment means 20 has a transversely-spaced pair of vertically-movable right and left racks 82, 82'; and a horizontal transversely-extending rotatable shaft 83 having a rightward handle 84 and journalled in a right pillow block 85 suitably secured to rightward table portion 62 by bolts 86, and a left pillow block 85' similarly secured to leftward table portion 61 by bolts 86'. The right and left racks 82, 82' are shown as having planar vertical left side surfaces 88, 88'; planar vertical right side surfaces 89, 89'; transversely-extending planar vertical rear surfaces 90, 90' (FIG. 9); and opposite vertical forward surfaces including toothed portions 91, 91'. In FIG. 4, the lower ends of racks 82, 82', respectively, are shown secured to the bar 51 of the chain saw by bolts 92, 92' having their vertical threaded shank portions received in internally threaded recesses provided within the lower marginal end portions 93, 93' of the racks 82, 82', respectively.

As best shown in FIGS. 8 and 9, a transversely-spaced pair of right and left pinions 94, 94' are mounted fast to shaft 83 at transversely-spaced locations over the rightward and leftward table portions 62, 61 to operatively engage the right and left toothed portions 91, 91' of racks 82, 82', respectively. Hence, when handle 84 is moved to rotate shaft 83 in a clockwise direction (FIG. 9), pinions 94, 94' will cause the vertically-movable racks 82, 82' to move downwardly, thereby lowering the chain saw relative to the carriage. Conversely, when handle 84 is moved to rotate shaft 83 in a counterclockwise direction (FIG. 9) pinions 94, 94' will cause racks 82, 82' to move upwardly, thereby raising the chain saw relative to the carriage.

During such rotation of shaft 83 and pinions 94, 94', racks 82, 82' are constrained to move vertically and are guided by a pair of transversely-spaced right and left rack guides 95, 95' having left sides 96, 96' arranged to face rack left side surfaces 88, 88', respectively; right sides 98, 98' arranged to face rack right side surfaces 89, 89', respectively; a rearward pair of vertically-spaced guide rollers 99, 99' arranged to act upon the rack rear surfaces 90, 90', respectively; and freely-rotatable lower forward guide pinions 100, 100' arranged to engage rack toothed portions 91, 91', respectively, below pinions 94, 94'. These rack guides 95, 95' may be secured to the right and left table portions 62, 61 of carriage top plate 60 by a plurality of bolt fasteners 101, 101', respectively, passed through lateral mounting flanges of the rack guides 95, 95' and secured to table portions 62, 61, respectively.

The adjustment means 20 may further include a stop pinion 102 mounted fast to shaft 83 over right table portion 62, and a dog-leg lever 103 pivotally mounted on carriage and having a toothed portion or sector 104 arranged to matingly engage stop pinion 102 to hold shaft 83 immovable at a selected angular position, thereby maintaining the vertical position of the racks 82, 82' and the chain saw at a selected height relative to the carriage.

Referring now to FIGS. 1, 4, 5 and 6, the saw mill may further include one or more holding means, generally indicated at 105, mounted on the frame lower section 14 adapted to support the lower arcuate surface 19'' of a log 19 being sawed. As best shown in FIG. 5, the holding means 105 may preferably include a transversely-extending horizontal rotatable rod 109 suitably journalled in the vertical webs of lower section I-beams 21, 22 and having a rightward handle portion 110, and its left end portion provided with one collar 111 arranged to face the right surface of web of left I-beam 21 and another collar 112 secured to this rod and arranged to face the opposite left surface of this I-beam web so that longitudinal movement of rod 109 will be restrained within permissible limits. A transversely-spaced pair of vertical right and left circular discs 113, 113' are shown eccentrically-mounted on rod 109 to move between a raised operative position when handle 110 is rotated to one angular position (FIG. 5), and a lowered inoperative position concealed beneath the planar upper surface of frame lower section 14 when handle 110 is rotated to another angular position (FIG. 4). Hence, the peripheral edges of discs 113, 113' act as cam members when rod 109 is rotated to the position depicted in FIG. 5 to support or cradle the lower arcuate surface 19'' of a log 19. However, when a partially-squared log to be sawed has a planar lower face, such as log face 19', rod handle 110 may be suitable rotated to retract and conceal discs 113, 113' within the frame lower section, thereby allowing this squared log face 19' to rest directly upon the planar upper surface of frame lower section 14, as shown in FIG. 6.

Referring now to FIGS. 4 and 5, the saw mill 10 may further include a peavey stop 114 having a collar 115 rotatably and slidably mounted on shaft 109, and an elongated stop member 116 having one end fixed to collar 115 and adapted to pivot about the axis of shaft 109 between a raised position (FIG. 5) wherein a raised boss 118 on the right side of member 116 is adapted to rest on the top flange of I-beam 22, and a lowered position (FIG. 4) wherein member 116 may be concealed within the lower section to rest on an L-shaped support 119 secured to I-beam 22. Peavey stop 114 may be suitably rotated and slid into the operative raised position shown in FIG. 5 to provide an abutment member against which a round log may be turned or rotated about its axis by suitable manipulation of a conventional peavey hook.

In FIGS. 4, 5 and 6, the saw mill 10 is shown as including an end stop, generally indicated at 120, operatively mounted on the frame lower section 14 to prevent longitudinal movement of a log being sawed relative to the frame. As best shown in FIG. 6, this end stop 120 comprises a vertical plate-like member 121 having an intermediate hole through which a horizontal bolt 122 may be passed and suitably secured to an intermediate channel 25 such that a normally lower portion 123 of this plate-like member contains more mass than a normally upper portion 124 thereof. Hence, member 121 is counterweighted and thereby biased to the operative position depicted in FIG. 4 wherein the normally upper portion 124 is arranged to abut a front end face 106 of a log being sawed, this stop member preventing further forward longitudinal movement of the log being sawed relative to the frame. However, if a squared log face 19' is slid transversely across the frame lower section to engage the raised bosses 125, these being spaced longitudinally along the right side of the frame lower section to prevent further transverse movement of the log relative to the frame (FIG. 1), the intermediate end stop members 121 engaged by this log may freely pivot to the concealed positions depicted in FIG. 6.

So as to make explicit that which is implicit, the presently preferred embodiment contemplates that when the operating saw is moved longitudinally toward the front end of the frame and the forward log-engaging portion of the cutting chain is moved from left to right at the cutting speed (FIG. 4), the log may be restrained against further forward longitudinal movement by one end stop 120 engaging the forward end face 106 of the log, and restrained against further rightward transverse movement by the plurality of raised bosses 125 which block the squared face 19' of the log against the lateral force component exerted on the log by the moving cutting chain.

Moreover, to facilitate moving a new round log onto the frame lower section, the saw mill is shown provided with a pair of longitudinally-spaced ramps 126 which at their rightward upper ends are pivotally connected to clamps 128 arranged to engage the top flange of lower section left I-beam 21 at any selected location.

Adverting now to FIG. 4, the saw mill 10 may preferably include support means, generally indicated at 129, mounted on the motor housing 52 of the chain saw and adapted to slide along a squared side face 19' of a log being sawed to partially support the weight of the cantilevered motor unit of the chain saw. In its simplest form, the support means 129 may simply include an arcuate C-shaped metal strip having its upper end portion secured to the bar 51 of the saw by bolt 92, and having its lower end portion provided with a hole through which a pin 130 depending from the new housing 52 may be passed to retain the position of the strip relative to the saw housing.

Referring now generally to FIGS. 1 and 4, and particularly to FIG. 7, the saw mill 10 may further include throttle trigger disengagement means, generally indicated at 131, engaging the throttle trigger 54 of the chain saw and operative to cause the chain saw when operating at a cutting speed to return to a slower idle speed. In the well known manner, the pivotal chain saw throttle trigger 54 is designed to move between an extended position (not shown) representative of the idle speed of the saw, and a squeezed or retracted position (FIG. 7) representative of the saw operating at a cutting speed. As may be conventional with the larger models of presently available chain saws, such as Homelite Model 2100, a detent mechanism (not shown) is mounted on the saw handle 53 and may be selectively engaged to continually maintain trigger 54 in the squeezed or retracted position such that the saw will continue to operate at its cutting speed until the trigger is again squeezed to release the engaged detent and allow the trigger to return to the extended position, thereby permitting the operating saw to return to its idle speed.

As best shown in FIG. 7, the trigger disengagement means 131 broadly includes a generally S-shaped member 132 having a downwardly-extending first leg 133 pivotally mounted on the handle 53 at the pivotal axis of the trigger 54, a vertical intermediate leg 134, and an upwardly-extending second leg 135; an intermediately-pivoted lever member 136 mounted on the second leg 135 of the S-shaped member 132 and having a horizontal inwardly-projecting arm 138 and an outwardly projecting horizontal lever 139; and a torsion spring 140 surrounding second leg 135 and having one end acting on member 132 and its opposite end acting on lever member 136 such that the lever member 136 is continuously biased to move in a counter-clockwise direction with respect to second leg 135, as seen in FIG. 7.

The trigger disengagement means 131 may further include an object, such as L-shaped member 141 (FIG. 1) having the free end of its lower horizontal leg 142 arranged to grasp lower section right I-beam 22, and having a vertical leg or post 143 positioned to be contacted by the free end of lever 139 when the saw is moved longitudinally along the frame. Desirably, member 141 is positioned such that the lever 139 will contact post 143 immediately after the saw has completed making its longitudinal cut in a log being sawed, this desired position of post 143 being generally shown in FIG. 1 to contact the exiting saw.

When lever 139 contact post 143, arm 138 will act against intermediate leg 134 to pivot members 132 and 136 clockwise about the axis of leg 133, as seen in FIG. 7, this causing intermediate leg 134 to further depress trigger 54 to disengage the detent. When the detent has been so disengaged, the trigger 54 will snap outwardly to its extended position, thereby causing member 136 to pivot clockwise about second leg 135 against the torsional bias of spring 140. Thereafter, spring 140 will urge member 136 to pivot in a counter-clockwise direction such that arm 138 will again contact intermediate leg 134 at a new position at which the free end of lever 139 may pass by post 143. Hence, the trigger disengagement means 131 is operative to automatically cause the operating saw to return from its cutting speed to its slower idle speed when the saw exits a sawed log to prevent the saw from over-speeding.

In this manner, the inventive saw mill 10 may employ a conventional chain saw to cut longitudinal slabs from a log. In this regard, the saw mill is capable of supporting logs having either round arucate surfaces or squared surfaces, and is capable of blocking such logs against both longitudinal and transverse movement relative to said frame due to the influence of the longitudinal direction of saw movement and the transverse direction and speed of its moving cutting chain.

While the disclosed embodiment constitutes a presently preferred form of the present invention, it will be clearly understood by persons skilled in this art that various changes and modifications may be made without departing from the spirit of the invention which is defined by the following claims.

What is claimed is:

1. A saw mill adapted to make a longitudinal cut in a log, comprising:
   an elongated frame having a front end and a rear end, said frame including a horizontal lower section adapted to support a log to be sawed and including a horizontal upper section spaced above said lower section;
   a carriage arranged on said upper section for movement therealong in either longitudinal direction;
   carriage movement means engaging said carriage and said front and rear frame ends and operable to move said carriage along said upper section in either of said longitudinal directions;
   a chain saw positioned between said upper and lower sections and supported by said carriage for movement therewith and operable to make a longitudinal cut in a log supported by said lower section; and
   adjustment means operatively arranged between said chain saw and carriage for adjusting the vertical position of said chain saw relative to said carriage, said adjustment means including a pair of transversely-spaced vertically-movable racks having their lower ends connected to said chain saw, a transverse shaft rotatably mounted on said carriage, and a pair of transversely-spaced pinions mounted fast to said shaft and positioned to engage said racks,
   whereby by rotating said shaft said racks may be moved to adjust the vertical position of said chain saw relative to said carriage.

2. A saw mill as set forth in claim 1 wherein said carriage movement means includes:
- a pulley mounted on one of said frame ends;
- a rotatable drum mounted on the other of said frame ends; and
- a flexible cable having its ends secured to said carriage, having one portion passed around said pulley, and having another portion wound around said drum,
- whereby when said drum is rotated in one angular direction said carriage is moved in one longitudinal direction, and when said drum is rotated in an opposite angular direction said carriage is moved in the opposite longitudinal direction.

3. A saw mill as set forth in claim 1 wherein said chain saw includes a bar, and said rack lower ends are connected to said bar.

4. A saw mill as set forth in claim 3 and further including:
- a fuel tank mounted on said carriage;
- an oil tank mounted on said carriage;
- a fuel conduit communicating said fuel tank with the fuel tank of said chain saw; and
- an oil conduit communicating said oil tank with said bar for lubricating the track groove of said bar.

5. A saw mill as set forth in claim 1 wherein said adjustment means includes:
- stop means mounted on said carriage and adapted to releasably hold said shaft immovable at a selected angular position to maintain a selected vertical height of said chain saw relative to said carriage.

6. A saw mill as set forth in claim 5 wherein said stop means includes:
- a stop pinion fast to said shaft; and
- a lever pivotally mounted on said carriage and having a toothed portion adapted to releasably engage said stop pinion,
- whereby when said toothed portion is engaged with said pinion said shaft is held immovable.

7. A saw mill as set forth in claim 1 further including:
- holding means mounted on said frame lower section for supporting an arcuate surface of a log to be sawed, said holding means including a transversely-extending rotatable rod journalled in said lower section and a pair of transversely-spaced cam members fast on said rod.

8. A saw mill as set forth in claim 7 wherein said cam members are circular discs mounted eccentrically on said rod such that when said rod is rotated to an operative position said discs may be exposed above said lower section to support said arcuate log surface, and when said rod is rotated to an inoperative position said discs may be concealed within said lower section.

9. A saw mill as set forth in claim 7 and further including:
- a peavey stop having a collar slidably and rotatably surrounding said rod and adapted to be moved to a raised position and to a lowered position.

10. A saw mill as set forth in claim 1 and further comprising:
- trigger disengagement means engaging the throttle trigger of said chain saw and operative to cause said chain saw when operating to return from a cutting speed to an idle speed when said disengagement means strikes an object as said carriage is moved longitudinally along said frame.

11. A saw mill as set forth in claim 1, further comprising:
- an end stop mounted on said lower section and adapted to prevent longitudinal movement of a log being sawed relative to said lower section, said end stop being pivtally mounted on said lower section and counter-weighted to move to an operative raised position but also adapted to pivot to an inoperative position concealed within said lower section.

12. A saw mill as set forth in claim 1 and further comprising:
- a plurality of raised bosses mounted on the upper surface of said lower section and adapted to engage a squared side face of a log being sawed to prevent transverse movement in one direction of said log relative to said lower section.

13. A saw mill as set forth in claim 1, further comprising:
- support means mounted on the motor-housing of said chain saw and adapted to slidably engage a squared side face of a log being sawed to partially support the weight of the motor unit of said chain saw.

* * * * *